Nov. 26, 1940.    F. W. GUIBERT ET AL    2,222,660
ADJUSTABLE LIQUID METERING DEVICE
Original Filed Aug. 5, 1936    6 Sheets-Sheet 1

INVENTORS
Francis Walter Guibert
Frederic B. Fuller
BY John Flam
ATTORNEY

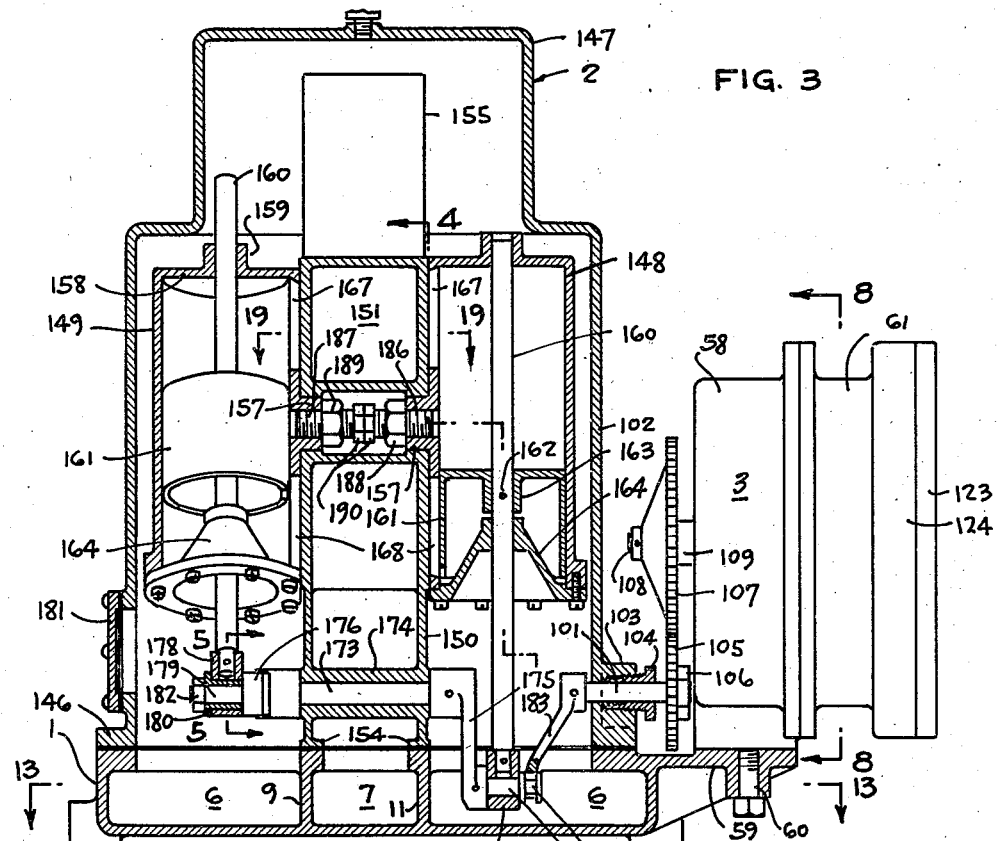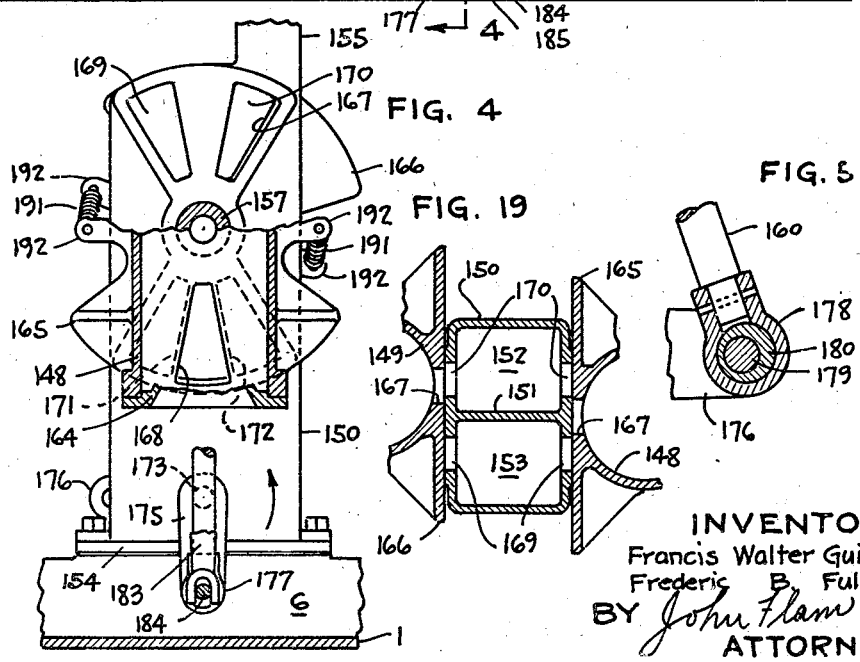

INVENTORS
Francis Walter Guibert
Frederic B. Fuller
BY John Flann
ATTORNEY

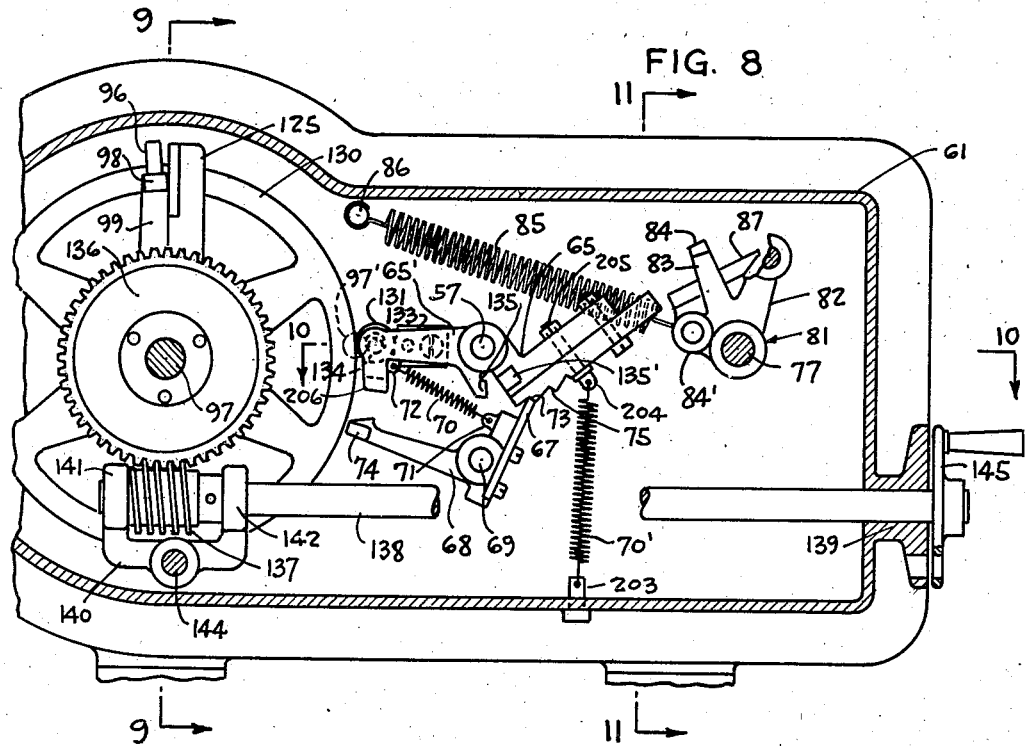
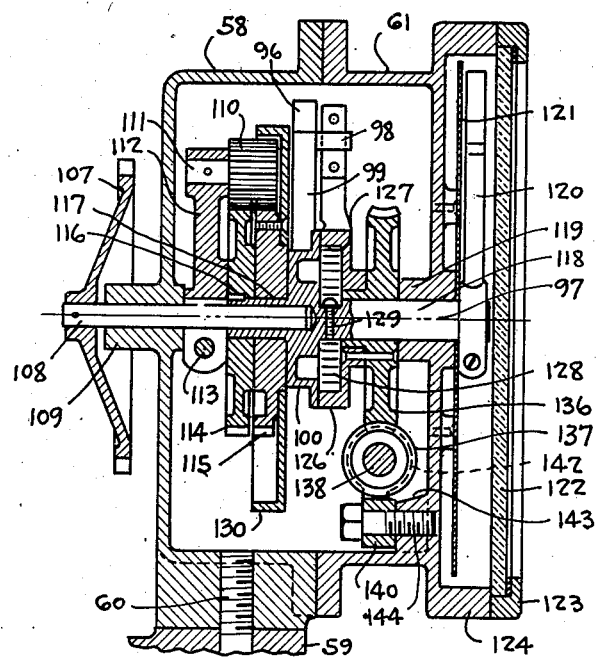
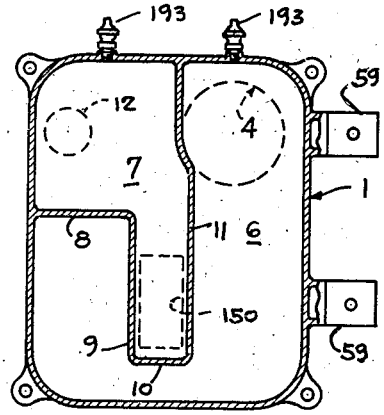
INVENTORS
Francis Walter Guibert
Frederic B. Fuller
BY John Flam
ATTORNEY

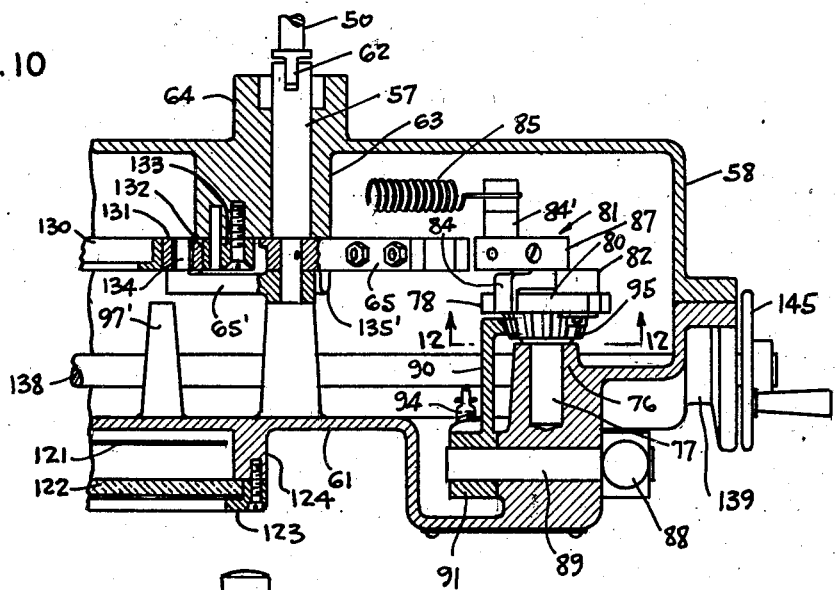

Nov. 26, 1940.   F. W. GUIBERT ET AL   2,222,660
ADJUSTABLE LIQUID METERING DEVICE
Original Filed Aug. 5, 1936   6 Sheets-Sheet 6
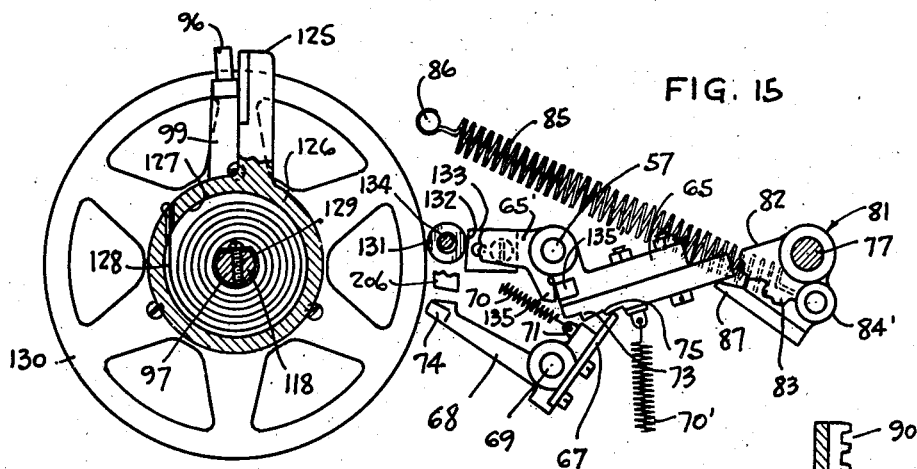
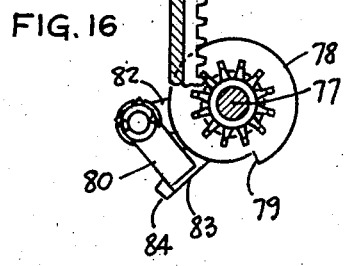
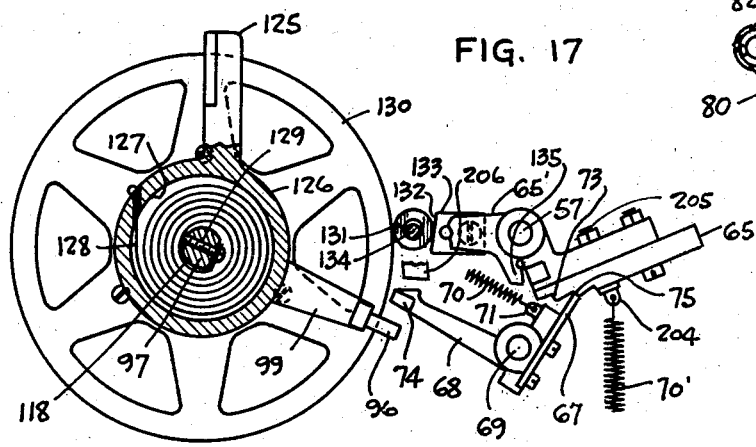
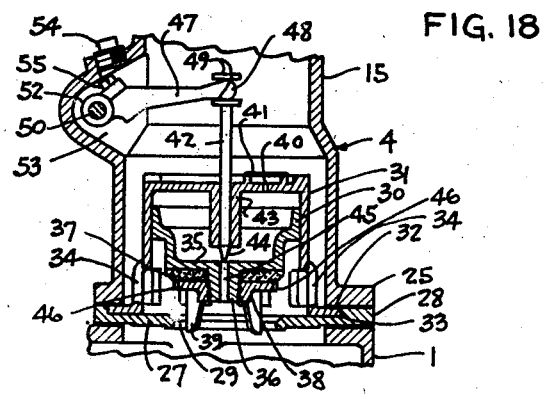
INVENTORS
Francis Walter Guibert
Frederic B. Fuller
BY *John Flam*
ATTORNEY Patented Nov. 26, 1940

2,222,660

UNITED STATES PATENT OFFICE 2,222,660

ADJUSTABLE LIQUID METERING DEVICE

Francis Walter Guibert, Beverly Hills, and Frederic B. Fuller, Whittier, Calif.; said Fuller assignor to said Guibert Application August 5, 1936, Serial No. 94,408
Renewed July 22, 1939

11 Claims. (Cl. 221—101)

This invention relates to a device for metering liquids, such as water or gasoline. More particularly, it relates to devices of this character in which predetermined successive quantities or batches are delivered, and the amount delivered may be set or adjusted.

Such a measuring device is shown in a prior application, filed June 5, 1934 in the name of Francis Walter Guibert, entitled Liquid measuring device, Serial Number 729,102; and patented October 13, 1936, No. 2,057,333.

In such devices, it has been proposed to utilize a valve controlled by a meter having rotatable elements in the path of the liquid being metered. It is one of the objects of this invention to improve the device by utilizing a different form of meter; specifically, by the provision of a meter of the piston displacement type.

Such a meter can be calibrated to be quite accurate under normal conditions of operation. However, problems arise when the liquid passed to the metering device has a pressure variable within wide limits. Under high pressure operation, frictional forces may be produced that seriously affect the accuracy of the meter, and this is especially true where generously proportioned valves are provided for controlling the displacement piston meter. It is another object of this invention to obviate the creation of large frictional forces in the operation of the piston displacement meter, whereby no appreciable inaccuracy may occur.

In metering devices of this character, it has been proposed to provide an adjustable rest or abutment which cooperates with a member moved by the meter, in order to limit this motion, and thereby to determine the amount of liquid delivered in the cycle. The adjustment was usually accomplished by a mechanism similar to a pawl and ratchet. In order obtain fine graduations, numerous small teeth had to be provided. This arrangement, while generally satisfactory, involved expensive machine work and made it impossible to adjust the quantity except in increments determined by the tooth spacing. It is another object of this invention to make it possible to adjust the volume delivered in a continuous manner as distinguished from the discontinuous manner discussed herein.

It is still another object of this invention to make it possible to alter in a simple manner, the range of operation of the device, as regards the maximum amount of liquid capable of being delivered in any cycle. For example, the desired range of adjustment may be from zero to fifty gallons; by the aid of this invention, it is a simple matter to alter the range of adjustment, say, from zero to several hundreds of gallons, or even higher.

The metering device is intended to be used for metering liquids in general, including water for use in concrete mixing plants. The source of liquid supply may be such that foreign matter or dirt may be carried into the device with the liquid, and, in due time, clog the mechanism sufficiently to render the device inoperative. It has been proposed to provide a screen for preventing such an occurrence; but experience has demonstrated that these screens inevitably become so loaded as substantially to stop the flow of liquid. Accordingly, operators of the metering device often cut out the screen when this condition is reached; and the benefits of the screen are lost. It is accordingly another object of this invention to provide a screen structure which is readily removable for cleaning or replacement.

It is still another object of this invention to provide a control mechanism of simple form for initiating the delivery cycle; and for ensuring that the cycle will be completed before a new one can commence.

It is still another object of the invention to provide a valve control mechanism by the aid of which water hammer or other forms of harmful transient phenomena are eliminated.

It is still another object of the invention to provide a simple calibrating adjustment for the piston displacement meter which measures the volume of liquid flowing through the device.

It is still another object of this invention to provide a fluid tight casing for the meter, so arranged that in case any dangerously high pressure is built up in the casing, a safety valve will open to relieve the pressure.

It is still another object to make it possible to drain the liquid from the meter and its casing in a convenient manner.

It is still another object of this invention to provide an indicating means which shows directly at all times how much liquid is still to be delivered in the cycle before the cycle is completed.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 3 is a view mainly in section, taken along plane 3—3 of Fig. 1;

Fig. 4 is a fragmentary sectional view taken along plane 4—4 of Fig. 3;

Fig. 5 is a detail fragmentary sectional view taken along plane 5—5 of Fig. 3;

Fig. 8 is an enlarged horizontal sectional view taken along plane 8—8 of Fig. 3;

Fig. 9 is a sectional view taken along plane 9—9 of Fig. 8;

Fig. 10 is a fragmentary sectional view taken along plane 10—10 of Fig. 8;

Fig. 11 is a sectional view taken along the plane 11—11 of Fig. 8;

Fig. 12 is a detail sectional view taken along plane 12—12 of Fig. 10;

Fig. 13 is a sectional view taken along plane 13—13 of Fig. 3;

Fig. 14 is an enlarged sectional view taken along plane 14—14 of Fig. 6;

Fig. 15 is a view similar to Fig. 8, but showing a closed position of the mechanism;

Fig. 16 is a fragmentary view similar to Fig. 12, but illustrating a different position of the operating parts;

Fig. 17 is a view similar to Fig. 15, but showing an intermediate or dribble position of the control mechanism;

Fig. 18 is a fragmentary view of the main control valve shown in fully opened position; and Fig. 19 is a detail sectional view taken along plane 19—19 of Fig. 3.

The liquid measuring device includes in general three main elements: a liquid flow meter; a control valve through which the liquid to be metered is passed; and a control mechanism whereby the valve is operated to close at the end of a metering cycle. These elements are all conveniently supported on a common base 1, the structure of which will be hereinafter more completely described. The base 1 is shown to best advantage in Fig. 13.

In the present instance the liquid flow meter 2 (Figs. 1, 2, 3 and 6) serves to measure the volume of liquid being delivered. When a predetermined amount has been delivered, the control mechanism 3 (Figs. 2, 3 and 7) serves to close the control valve 4 (Figs. 2, 6, 7 and 18) to complete the cycle which began with the opening of valve 4.

Figure 6:
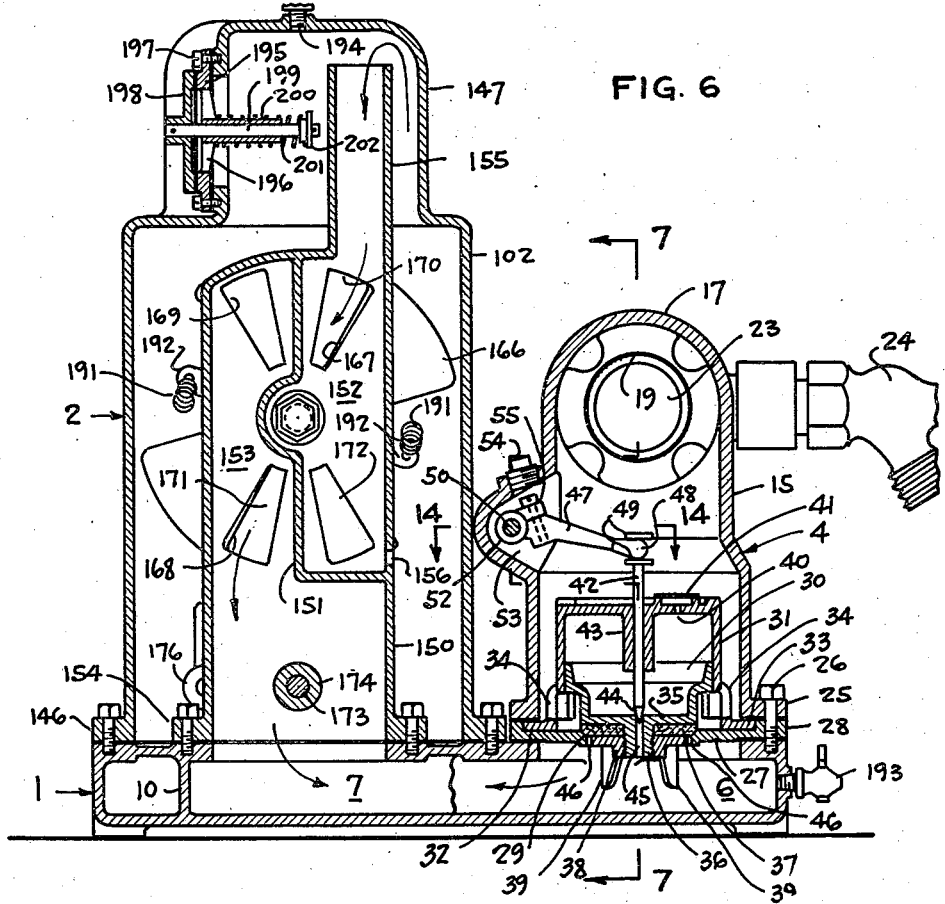
Fig. 6 is a sectional view taken along plane 6—6 of Fig. 2.

The control valve 4 may be located anywhere in the path of the liquid flow. In the present instance, it is shown located ahead of the liquid flow meter 2. It is provided with an intake conduit 5 (Figs. 1, 2 and 7) adapted to be connected to a source of liquid supply under pressure, such as the water mains or a gasoline reservoir or the like. The liquid passes through the valve 4 and is discharged through it into a chamber 6 formed in the base 1. (Figs. 3, 4, 6, 7 and 13.) Another chamber 7 is formed in the base 1 as by the aid of the walls 8, 9, 10 and 11 (Figs. 3, 6 and 13). These chambers 6 and 7, as shown most clearly in Figs. 3, 6 and 7, have openings in the top of the base 1. These openings are closed by appropriate flanges hereinafter to be described formed on the bottom of the control valve 4 and the liquid flow meter 2.

The liquid flow meter 2 has an inlet connection with the chamber 6 and an outlet connecting with the chamber 7. This chamber 7 communicates with an upright conduit 12 (Figs. 1, 2 and 7) which discharges the liquid from the device to the place where it is to be used. It is thus apparent that the base member 1, in addition to its function of supporting the units 2 and 4, also serves to provide chambers 6 and 7 for connecting these units together.

Figure 2:
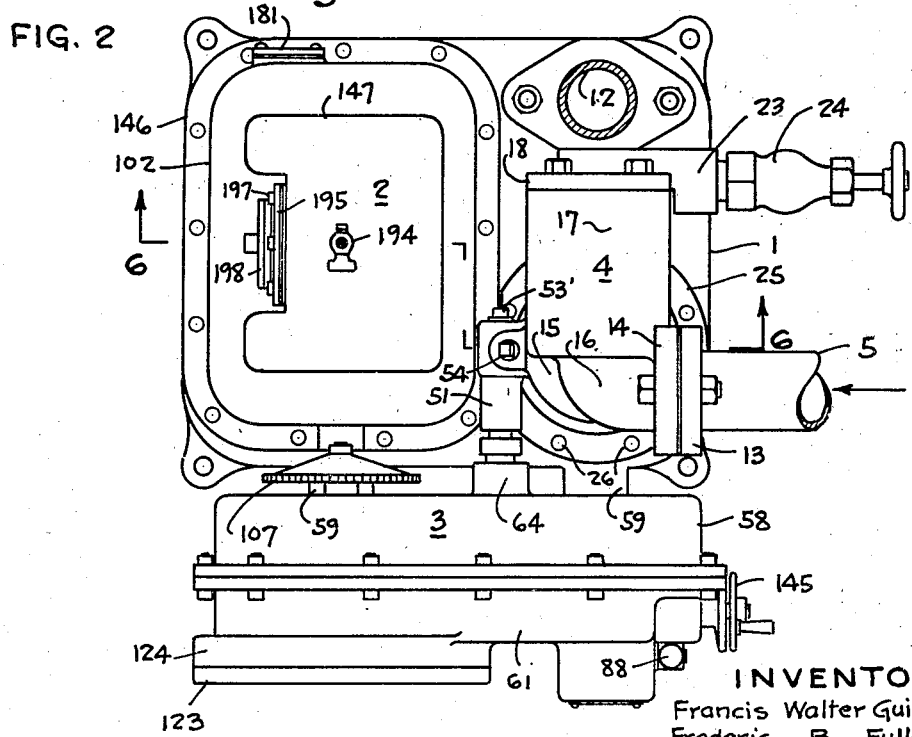
Fig. 2 is a top plan view thereof.
Figure 7:
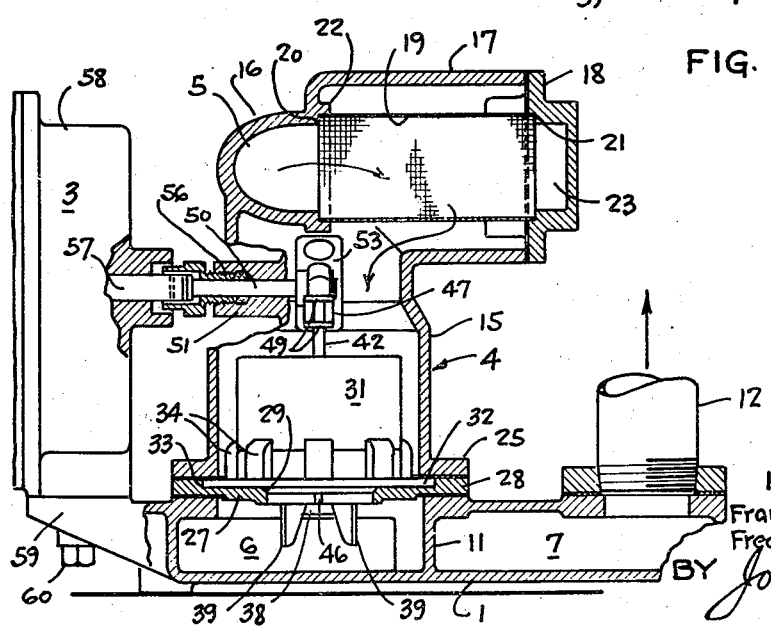
Fig. 7 is a fragmentary sectional view taken along the plane 7—7 of Fig. 6.

The valve 4, which is connected to the intake conduit 5, will now be described. Conduit 5, as shown most clearly in Fig. 2, is provided with a flange 13 by the aid of which it may be connected to a corresponding flange 14, formed integral with the main valve casing 15 (Figs. 6, 7 and 18). This casing 15 has an elbow 16 (Figs. 2 and 7) leading from the flanged aperture in the casing to a tubular extension 17. This tubular extension has a cap 18 which closes the open end of the extension 17. A wire mesh screen 19 (Figs. 6 and 7) is annularly spaced from the walls of the extension 17, and its interior at its left hand end is in communication with the elbow 16. In this way, liquid passing through conduit 5 and elbow 16 will pass to the inside of the cylindrical screen 19, and will then pass through the screen and downwardly into casing 15. This screen 19 serves to catch dirt or foreign matter which would otherwise enter the device and interfere with its efficient operation.

The screen 19 is removably held by the aid of a shoulder 20 formed on the flange 22 on the inside of the elbow 16, and a shoulder 21 formed on the inside of cap 18. This flange 22 surrounds the outlet of elbow 16 and encompasses the left hand end of the screen 19. It is apparent that by removing the cap 18 the screen 19 may be removed or replaced or cleaned as occasion may require.

As shown most clearly in Figs. 2 and 6, the cap 18 may be provided with an extension passage 23 connecting to an ordinary spigot valve 24, making it possible to withdraw liquid from the source of supply before it passes to the metering elements or through the valve 4. This liquid so withdrawn may serve to carry off any accumulation of dirt.

The valve body 15 has a lower tubular portion extending downwardly from the extension 17, as shown most clearly in Figs. 6, 7 and 18. This tubular portion is provided with a flange 25, through which fastening bolts 26 may be passed to hold this casing 15 rigidly to the base 1. The valve seat 27 is formed separate from the casing 15 and is provided with an intermediate flange 28 clamped between the base 1 and the flange 25. Appropriate packing may be provided between the flanges 25 and 28 and between flange 28 and base 1 in order to ensure a fluid tight construction.

The valve seat 27 is provided with a sloping valve opening 29 which serves, when the valve 4 is open, to pass liquid from the casing 15 to the chamber 6 in base 1.

The main valve closure in this instance is shown formed by the aid of a piston 30. This piston 30 is accommodated for axial movement in a cylinder 31, concentric with the lower portion of the casing 15. This cylinder 31 may be provided with a supporting flange 32 accommodated in a recess 33 in the flange 28 of the valve seat 27. This flange 32 for supporting the cylinder 31 is connected to the cylinder by the aid of a series of supports 34 (Figs. 6, 7 and 18). It is apparent that the lower end of cylinder 31 is open to the inside of casing 15, whereby liquid may flow between the supports 34 and downwardly through the valve seat 29 when the valve closure 30 is open.

The piston closure member 30 is provided with a bottom flange 35 from which extends a central threaded boss 36. The closure member proper 37 is held tightly against the flange 35 by an interiorly threaded flange member 38, engaging the boss 36, and provided with the guide wings 39. This closure member proper 37 may be made from any appropriate material, such as leather or fibre. It has a sloping face adapted to co-operate with the face 29 of the seat 27. It is apparent that when the piston closure member 30 is urged downwardly, the member 37 will be seated against the seat 29 to close the valve.

The closed position of the valve 4 is indicated in Fig. 6. It is held in closed position mechanically, as well as by fluid pressure. Thus for example, there may be a restricted opening 40 in the top of the cylinder 31 by the aid of which the cylinder chamber is placed in communication with the liquid in the casing 15. The liquid within the cylinder 31 urges the piston 30 toward closing position. An appropriate screen 41 may be provided above the restricted opening 40.

The opening and closing of the valve 4 is controlled, however, by an auxiliary closure member 42 movable in a direction parallel with the movement of piston 30. This auxiliary member 42 is shown in the present instance as a pin or rod coaxial with the piston 30 and guided for axial movement in a boss 43, depending from the top wall of the cylinder 31. The lower end of the auxiliary closure member 42 is formed as a needle valve being in the form of a conical tip 44. This conical tip 44 cooperates with a port 45 leading directly through the closure member 30 and into the chamber 6 of the base 1. This port 45 is somewhat larger in size than the restricted opening 40.

In order to open the valve 4, the auxiliary closure member 42 is lifted, permitting liquid to flow through the port 45. Since this port 45 is larger than restricted opening 40, it is apparent that liquid passes from the cylinder 31 faster than the supply of liquid thereto through the opening 40. The result is a reduction in pressure in the cylinder chamber, whereupon the pressure below the piston closure 30 overpowers the pressure within the cylinder chamber. The valve closure member 30 therefore follows the upward movement of the member 42 and the valve opens by the differential liquid pressure thus obtained. The port 45 will thus be brought to approach the point 44, but will not be brought to a completely closed position. A condition of equilibrium will be established such that the port 45 is at least partly open.

It is also apparent that since the auxiliary closure member 42 is entirely surrounded by the liquid in the valve intake, there is no fluid pressure tending to keep it open or closed, and its movement is rendered free. The fully opened position of valve 4 is shown in Fig. 18.

The closure of valve 4 is accomplished by a downward movement of the auxiliary closure 42. This downward movement causes the piston 30 to move toward closing position, and upon completion of its movement, as shown in Fig. 6, it is there held in closed position, as by the liquid pressure which exists in the cylinder 31.

As will be described hereinafter, the closing of the valve 4 is made in more than one step in order to avoid water hammer or other harmful transient effects. In the present instance there is an intermediate or dribble position, in which the auxiliary closure 42 has not quite urged the piston 30 to the closed position of Fig. 6. In order to permit the passage of a substantial amount of liquid past the closure ring 37 even when this closure ring is very close to the seat 29, the flange member 38 is provided with a series of notches 46 for the purpose of keeping the amount of dribble constant in spite of wear on the packing 37 or other parts of the mechanism.

The controlling movements of the auxiliary closure 42 are obtained in this instance by the aid of a rocking lever 47 (Figs. 6, 14 and 18). This rocking lever is provided with a forked end 48 adapted to engage between the collars or flanges 49 at the upper end of the auxiliary closure 42. The lever 47 is mounted on a cross shaft 50 (Figs. 6, 7, 14 and 18). This shaft 50, as shown most clearly in Figs. 7 and 14, is journalled in a boss 51 extending from the interior wall of casing 15. The hub 52 of the lever 47 is accommodated in a recess 53 in communication with the interior of casing 15. A plug 53' (Fig. 14) closes an aperture in the wall of recess 53 opposite to the boss 51 to facilitate machining. A similar plug 54 (Fig. 18) is utilized in the upper wall of the recess 53 to permit access to the screw 55 holding the lever 47 on the shaft 50. This shaft 50 extends out of the casing 15 through a packing gland 56 (Fig. 7) where it is coupled to a shaft 57 operated by the control mechanism 3 hereinafter to be described, and housed in the casing 58 (Figs. 7 and 8). The coupling of the two shafts 50 and 57 are shown to best advantage in Fig. 10, where it is seen that the shaft 50 has an extension 62 accommodated in a corresponding cross slot in the end of shaft 57.

Figure 1:
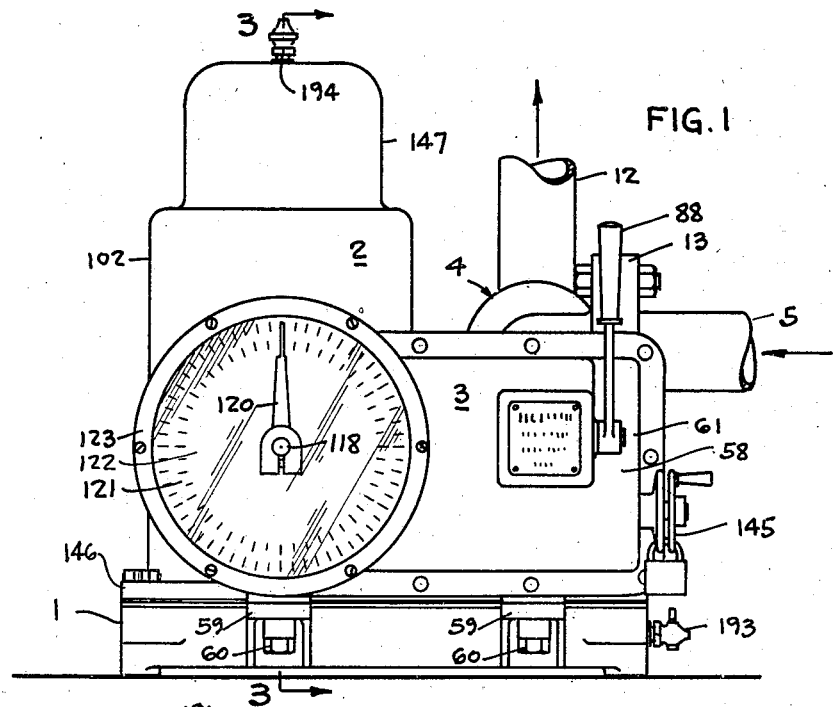
Figure 1 is a front elevation of a device embodying the invention.

The control mechanism casing 58 is supported, as shown most clearly in Figs. 1 and 3, upon the extensions 59 of the base 1 as by the aid of the bolts 60. The casing 58 also has a flanged cover member 61 to enclose the control mechanism substantially completely.

Within the control mechanism casing 58—61 is a manually operable mechanism for opening the valve 4 from the closed position of Fig. 6. This manually operated mechanism is most readily explained in connection with Figs. 8, 10, 11, 12 and 16.

The control mechanism shaft 57 is journalled in the boss 63 extending into the casing 58—61, as well as in the external boss 64. This shaft 57 carries at its inner end an integrally cast lever 65. The position of this lever 65 in Fig. 15 corresponds to the fully closed position of the valve 4. In order to open the valve, it is apparent that lever 65 must be rotated in a counterclockwise direction as viewed in Fig. 15. This rotation is effected by a mechanism to be described hereinafter. It is sufficient for the present to note that a latching means is provided for holding the lever 65 in its fully open position of Fig. 8. The latch 67 in that figure is shown as cooperating with a stepped shoulder 73 on the lower portion of the lever 65. The latch 67 and the shoulder 73 are preferably formed of hard wearing material.

The latch 67 is furthermore carried on a lever 68 pivoted by the aid of a shaft 69 journalled below the lever 65. Means is provided for urging the latch 67 to holding position. In this instance this is accomplished by the aid of a tension spring 70 extending between the ears 71 and 72 respectively on the lever 68, and a lever 65' free to rotate on shaft 57 but restrained in its angular rotation for a purpose to be hereinafter described. This tension spring 70 thus serves to urge the lever 65' to the position of Figs. 8 and 15. As the lever 65 is rotated in a counterclockwise direction to the position of Fig. 8, latch 67 is urged by the spring 70 against the shoulder 73, and the valve stays open until the latch 67 is released. Lever 65 is urged resiliently toward closing position by tension spring 70' anchored respectively at its ends to a stationary pin 203 anchored to the casing 58, and an ear 204 attached to bolt 205 for holding the parts of lever 65 together.

The latch 67 is adapted to be operated by the aid of an arm 74 of lever 68, in a manner to be hereinafter described. It is apparent from a consideration of Fig. 8 that if arm 74 be moved in a clockwise direction, it will cause the latch 67 to release the shoulder 73. An intermediate or dribble position, however, is provided, as shown in Fig. 17, where the latch 67 engages another shoulder 75 on the lever 65. The latch 67 and the shoulder 75 hold the valve shaft 50 in the dribble position preparatory to a complete closure of the valve 4. A further upward movement of arm 74 from the position of Fig. 17, releases the latch 67, and the parts are returned to the position of Fig. 15 by action of spring 70', and the valve 4 closes completely.

In passing from the fully open position of Fig. 8 to the dribble position of Fig. 17, the valve 4 is closed gradually. The valve 30 closes as fast as the water enters through port 40, which being restricted, ensures gradual movement. Dribble delivery takes place around the ring closure 37 and through the notches 46.

The mechanism for rotating the lever 65 from the closed position of Fig. 15 to the open position of Fig. 8 is such that an energy storing device is used for operating the lever 65 and to move this lever practically out of the path of any successive operations of the energy storing device, unless a cycle has been completed and the valve automatically closed as will be recounted hereinafter. The energy storing device is released before the lever is actuated. The force utilized for the movement of the lever 65 is then out of the control of the operator, and this force completely opens the valve 4. There is thus an assurance that only complete cycles of delivery can be obtained.

The mechanism for moving the lever 65 to open position is shown most clearly in Figs. 10, 11, 12 and 16. On the inside of the cover 61 for the control mechanism 3 there is a boss 76 (Figs. 10 and 11). In this boss there is driven a stationary shaft 77. This shaft carries a rotatable disc 78 having a single ratchet tooth 79. This ratchet tooth 79, when disc 78 is rotated on shaft 77, is arranged to engage a pawl 80 and thereby to impart corresponding rotation to an actuator lever 81 journalled on shaft 77. This actuator lever 81 has a plurality of arms, as shown most clearly in Fig. 8. One arm 82 provides a pivotal support for the pawl 80. Another arm 83 serves to support a guard 84 to limit the radial outward movement of pawl 80. Still another arm 84' provides an ear for the anchoring of one end of a long tension spring 85. The other end of tension spring 85 is anchored on a pin 86 located in the casing 58. The actuating arm 87, which may be formed of hard wearing material, is also carried by the lever 81, and is arranged to engage and cooperate with the lower surface of the lever 65. This engaging position of the actuating arm is illustrated in Fig. 15. In Fig. 8 the actuating arm 87 is shown as having already passed beyond the right hand end of lever 65. Lever 65 may be provided with a hard wearing insert to cooperate with the actuating arm 87.

Considering Fig. 8, it is seen that the tension of the spring 85 normally holds the actuating arm 87 in the position there illustrated, due to the particular relationship of the arm 84' to pivot shaft 77 and pin 86. However, as disc 78 is rotated, the tooth 79 picks up the pawl 80 on the actuator lever 81, and rotates it in a clockwise direction. This rotation continues with a consequent tensioning or stretching of spring 85 until the arm 84' is 180° advanced from the position shown in Fig. 8. When this position is passed, the tension of the spring 85 is immediately effective to complete the remaining 180° of rotation, and the actuating arm 87 is snapped quickly back to the position of Fig. 8. This snapping is permitted without interference from the disc 78, since there is no restraint on the pawl 80 against motion in a clockwise direction. As the actuator lever 81 completes its revolution, the pawl 80 is merely lifted by the tooth 79.

The rotation of disc 78 may be accomplished by the aid of a hand lever 88 which is available for manipulation outside of the casing 58—61. Thus, as shown most clearly in Figs. 10 and 11, this hand lever 88 is fastened to a cross shaft 89 journalled in the boss 76. At its inner end it carries a segmental bevel gear 90 having a hub 91 fastened to the shaft 89. This segmental gear 90 is in mesh with a bevel gear 95 fastened to the disc 78. The arrangement is such that a clockwise rotation of about 60° from the position of Fig. 11 is sufficient to give the disc 78 its operative movement. A tension spring 92 urges the shaft 89 to the position shown in Fig. 11. This spring 92 is appropriately anchored at one end in a pin 93 supported by the cover 61. It is anchored at its other end to the segment 90, as by the aid of a pin 94 attached radially in the boss 91.

When the lever 88 is moved in a clockwise direction, the disc 78 is rotated by the aid of the bevel gear 95, and there is a consequent tensioning of spring 85. As soon as the axis of spring 85 passes alignment with the line joining the axis of shaft 77 and pin 86, the actuator 81 is snapped over to the position shown in Fig. 8. The lever 88 is then returned to the original position of Fig. 11 by the spring 92, and the tooth 79 travels in a counterclockwise direction to attain the position of Fig. 12.

The snapping over of the actuator lever 81 brings the actuating arm 87 past the end of the lever 65, which is thrown and latched in the position of Fig. 8. Any subsequent rotation of actuator 81 is ineffective while the valve is latched in this way in open position, since the actuating arm 87 passes the end of the lever 65 without further rotating it.

As soon as the valve 4 is opened in the manner described, liquid is delivered through the valve 4 and seat 29 into the chamber 6 of the base 1. After a predetermined amount of liquid is delivered, the valve 4 is closed by actuation of arm 74. This actuation, however, takes place in two steps; that is, there is an intermediate dribble position illustrated in Fig. 17. When arm 74 is rotated in a clockwise direction from the position of Fig. 17, latch 67 is moved away from shoulder 75 and the mechanism is returned by spring 70' to the closed position of Fig. 15.

The means for moving the arm 74 in this manner is provided by the control mechanism 3 actuated by the liquid meter 2. Thus there is a member 96 (Figs. 8, 9, 15 and 16) carried by arm 99 which is advanced from the initial position (illustrated in Fig. 15) in a counterclockwise direction about an axis 97 in accordance with the delivery of liquid through the liquid flow meter 2. This member 96 is shown as having advanced from the initial position of Fig. 17 to a position where it has just engaged arm 74 to cause the arm 74 to move latch 67 into dribble notch 75. Further motion of member 96 in a counterclockwise direction will, after a short interval of delivery, again engage arm 74 to free latch 67 from the dribble notch 75, and thereby to close the valve 4 completely. After this is accomplished, the member 96 is returned automatically to its initial position in a manner to be later described.

The actuation of member 96 in the counterclockwise direction can be explained most readily by the aid of Figs. 3 and 9. Arm 99 is mounted on a hub 100 rotatable about the axis 97 by the aid of a transmission mechanism interposed between the output or delivery shaft 101 (Fig. 3) of the liquid flow meter 2, and the hub 100. This shaft 101 is adapted to be driven by any appropriate liquid flow meter. The particular construction of flow meter 2 will be hereinafter described. It is sufficient for the present to note that the shaft 101 is journalled near the lower portion of the casing 102 for the liquid flow meter 2, as by the aid of a boss 103. The shaft 101 extends from inside to the outside of the casing 102. The bearing for shaft 101 is made fluid tight, as by the aid of a packing gland 104. The shaft 101 carries a pinion 105 fastened to the shaft 101, as by the nut 106. The pinion 105 meshes with a gear 107 rotatable about the axis 97. This gear 107 is carried by a shaft 108 extending into the casing 58—61 and journalled in the boss 109 formed on the back of casing 58. Rotation of gear 107 in accordance with the quantity of liquid delivered through the liquid flow meter 2 imparts a planetary motion of revolution to a gear or pinion 110. This pinion 110 is freely rotatable on a stub shaft 111 fastened in the extremity of the crank arm 112. This crank arm 112 is rigidly fastened to the shaft 108 as by a key and a clamp screw 113 passing through the split hub of the crank 112.

The planetary motion of pinion 110 is caused to impart a reduced rate of rotation to a gear 114 coaxial with gear 107. This is obtained by providing a gear wheel 115, also meshing with pinion 110. During the process of delivery of the liquid, this wheel 115 is restrained in a stationary position. The number of teeth on gear 114 is slightly less than that of the gear 115. Thus for example, if stationary gear 115 has 85 teeth, and if rotatable gear 114 has 84 teeth, one complete planetary revolution of pinion 110 will cause gear 114 to be rotated by an angle corresponding to one tooth of the stationary gear 115. The ratio of reduction is therefore 85 to 1. Also in order to provide for a counterclockwise rotation of gear 114 to correspond with the counterclockwise motion of arm 99, the planetary motion of gear 110 must be in a clockwise direction as viewed in Figs. 8, 15 and 17. This is accomplished by causing shaft 101 driven by the liquid flow meter 2 to rotate in a counterclockwise direction, as viewed in Figs. 8, 15 and 17.

Since the number of teeth on gear wheels 114 and 115 is substantially the same, it is unnecessary to provide different sections of pinion 110 to correspond to the difference in the tooth pitches. If there should be a wider variation, pinion 110 should be provided with two sections with accurately cut teeth to correspond respectively with both of the tooth pitches.

It is thus seen that gear 114 is given a slow rotation by this mechanism. Gear 114 is fastened as by key 116 to the extension 117 of the hub 100. Accordingly, hub 100 with its arm 99 is rotated in accordance with the motion of gear 114. Stationary gear 115 has a central aperture permitting the extension 117 to pass through it. Shaft 108 has its right hand extremity journalled in the extension 117.

Hub 100 is also provided with an integral shaft 118 journalled in the boss 119 of the cover 61. The right hand extremity of shaft 118 extends outside of cover 61, where it carries a pointer 120. This pointer cooperates with a stationary dial 121 fastened to the outside of cover 61. The stationary dial 121 and pointer 120 can be protected as by the aid of a glass window 122 held as by a flange 123 to the circular flange 124 formed on the cover 61 around the dial 121. When the member 96 is moved in a clockwise direction to the initial position of Fig. 15, the pointer 120 also moves in a clockwise direction, to return ultimately to zero position at the completion of the delivery cycle. Accordingly, the pointer 120 indicates on scale 121 at all times during the delivery cycle how much liquid is still to be delivered in that cycle. The dial 121 may be graduated in gallons and fractions of a gallon.

When the end of the cycle is reached corresponding to the tripping of arm 74 from the dribble position of Fig. 17, the member 96 is returned to its initial position of Fig. 15. This is accomplished by causing gear 115 to rotate. Shaft 108 is then stationary because the liquid flow meter 2 is stalled. Accordingly, pinion 110 is prevented from revolving about axis 97, but is free to rotate about its own axis. It is apparent therefore that if gear 115 be rotated in a clockwise direction, it will rotate gear 110 in a counterclockwise direction; and this rotation of gear 110 imparts a clockwise rotation to wheel 114.

It is apparent that the returning of the member 96 to the initial position of Fig. 15 is accomplished through the same transmission mechanism as that which is utilized to impart counterclockwise rotation of member 96 from the delivery shaft 101 of the liquid flow meter 2.

The manner in which this restoring rotation is imparted to the wheel 115 may now be described.

The initial position of member 96 is determined by a stop arm 125 against which the extension 98 rests. This stop arm 125 is shown as carried by a hub 126 (Figs. 9, 15 and 17). For the present, this hub 126 may be considered as stationary. It is flanged so as to provide an annular recess 127 between it and the shaft 118. In this recess there is a coiled spiral spring 128. The outer end of the spring is anchored to the hub 126, and the inner end is anchored as by a screw 129 to the shaft 118. Now as shaft 118 is turned in a counterclockwise direction from the initial position of Fig. 15, the inner end of the spring 128 is wound up. It is permitted to unwind and impart reversed rotation to shaft 118 (and consequently to gear 115), by releasing a latch or stop cooperating with gear 115, at the end of the delivery cycle.

In order to provide this restraint to the gear wheel 115 during the delivery cycle, it is provided with a drum 130 (Figs. 8, 9, 10, 15 and 17). Against the outer braking surface of this drum a friction roller restraint 131 is provided (Figs. 8, 10, 15 and 17). This roller restrain 131 is arranged to drop between the periphery of the wheel 130 and a sloping face 132 of the block 133. This block 133 is shown to best advantage in Fig. 10, where it is indicated as being doweled and fastened to the hub 63 of casing 58. The restraining roller 131 is mounted on a pin 134 carried by lever 65'. It is provided with a large clearance with respect to this pin, so that it may be free to adjust itself properly between the cooperating surfaces of block 133 and drum 130. The roller 131 is furthermore restrained against axial removal by the vertical surface of hub 63. When the valve 4 is operated to the open position of Fig. 8, spring 70 urges lever 65' downwardly the roller 131 into position.

It is apparent that the roller 131 prevents clockwise rotation of wheel 130 because any attempt to move wheel 130 with the roller 131 in place would result in a tendency to carry the roller 131 further into the tapered space between face 132 and the periphery of wheel 130.

However, at the end of the delivery cycle, the roller 131 is released by the aid of a releasing arm 135 carried by the lever 65', and adapted to be engaged by a corresponding projection 135' on lever 65. This releasing position is indicated in Fig. 15, the valve 4 having been closed and roller 131 having been urged upwardly out of contact with the wheel 130. The spring 70 is ineffective to restrain roller 131, for there is a positive actuation of arm 65' by projection 135; and spring 70' is more powerful than spring 70.

Since the pinion 110 acts in a manner to urge the drum 130 in a clockwise direction, it is unnecessary to restrain this drum against rotation in a counterclockwise direction. The differential gearing including the elements 110, 114 and 115 serves as a powerful speed reducer, thus avoiding the need of speed reduction gears elsewhere in the mechanism. The roller 131 which restrains wheel 130 remains always in a fixed position, with respect to the case. In this way the locking and unlocking mechanism is simplified.

In order to adjust for the quantity of liquid to be delivered in any cycle, it is merely necessary to move the stop arm 125 in an angular direction so as to vary the initial position of the member 96. This adjustment can be accomplished by the aid of mechanism illustrated in Figs. 8, 9 and 10. Thus hub 126 which carries the stop arm 125, is fastened to the hub of a worm wheel 136. This worm wheel in turn is free to rotate on shaft 118. It is operated by a worm 137. This worm is fastened to a long shaft 138 extending through a bearing boss 139 in the cover 61. The shaft 138 is also journalled on each side of the worm 137 as by the aid of a bracket 140 having the bearing standards 141 and 142. Shaft 138 is accommodated in these standards. This bracket 140 can be fastened to a boss 143 on the inside of the cover 61 as by the aid of the bolt 144. In order to rotate the worm 137, a handwheel 145 is attached to the exposed end of shaft 138. Since the worm 137 forms an irreversible drive, it is seen that the stop arm 125 is held positively in any adjusted position.

It is apparent from the foregoing that by rotation of the handwheel 145, the worm wheel 136 and hub 126 may be rotated as desired. If it is rotated in a clockwise direction, as viewed in Fig. 15, the amount of liquid delivered in any cycle is increased. A counterclockwise rotation will serve to decrease the amount of liquid delivery in a cycle. Since arm 99 is urged resiliently against the stop arm 125 when the drum 130 is released, it is apparent that the adjustment of arm 125 in this manner will cause a corresponding adjustment of the initial position of member 96. The stop post 97' serves to limit the adjustment of arm 125 to less than one complete revolution. In this way it is assured that the tension on spring 128 cannot be reduced or increased beyond a convenient operative range.

A brief summary of the mode of operation of the apparatus as thus far described can now be set forth.

Assuming that the valve 4 is closed, corresponding to the position of Fig. 15, the meter delivery shaft 101 is stationary, and there is no motion in any other part of the apparatus. If it is desired to cause a cycle of delivery to take place, handle 88 is operated by swinging downwardly on it, as viewed in Fig. 11. This causes the actuating arm 87 to push against the lower end of the lever 65; and this lever will be latched by the latch 67 in the open position of Fig. 8. In this operation also, the roller 131 has been urged by spring 70 into restraining position with respect to the drum 130. Shaft 57, upon which lever 65 is mounted, operates shaft 50 of the valve 4 to lift the auxiliary closure 42 and thereby ultimately to open the valve to the open position of Fig. 18.

The liquid is then free to flow through the valve 4 to chamber 6; and from chamber 6 through the liquid flow meter 2, thence to chamber 7 and out through delivery pipe 12. The liquid flow meter 2 now serves to rotate the meter delivery shaft 101. This meter delivery shaft imparts a planetary motion to pinion 110. Since drum 130 is maintained in a stationary position, this planetary motion results in a counterclockwise rotation of gear 114, and therefore of hub 100, arm 99, and member 96. This rotation continues until near the end of the delivery cycle, when member 96 trips the arm 74, causing the latch 67 to engage against dribble shoulder 75 of lever 65, as illustrated in Fig. 17. In this dribble position the valve 4 is almost but not quite completely closed, and delivery of liquid at a reduced rate is still accomplished. After a short further counterclockwise rotation of member 96, the trip arm 74 is again tripped by member 96, and the lever 65 returns to the position of Fig. 15. In this position the roller 131 is released and valve 4 is returned to the closed position of Fig. 6. As soon as the valve closes, the meter delivery shaft 101 is stopped, and pinion 110 is maintained against planetary motion. The drum 130, however, is released and spring 128 acts on the drum to rotate it in a clockwise direction through the intermediary of the shaft 118. This clockwise rotation of drum 130 causes a similar clockwise rotation of wheel 115 and wheel 114; and the member 96 is returned to the initial position of Fig. 8, where it is yieldingly urged against stop arm 125. The cycle can then be started again as above described. In case of failure of the device to close the valve 4, continued motion of member 96 will move arm 74 positively to urge the roller 131 upwardly by contacting the boss 206 depending from arm 65'. The roller 131 is thus released. Therefore the drum 130 can continue to rotate in a clockwise direction, preventing any damage to the mechanism, even while arm 96 is restrained.

Should it be necessary for any reason to close the valve 4 in an emergency before the completion of a delivery cycle, this can be accomplished by rotating handwheel 145 to rotate the stop arm 125 in a clockwise direction until the arm 74 is tripped to the starting position. Ordinarily, however, a padlock can be snapped through a hole in the handwheel 145 to prevent unauthorized adjustment.

The liquid flow meter 2, which operates to drive the delivery shaft 101 is shown in this instance as enclosed by the casing 102 which is in communication with the chamber 6 of base 1. The casing 102 may be provided with a flange 146 (Figs. 1, 2, 3 and 6) by the aid of which it may be fastened to the top of base 1. As shown most clearly in Fig. 3, the distance between inner surfaces of the end walls of casing 102 correspond with the width of the base 1. Appropriate packing may be interposed between the flange 146 and the top of base 1 to render the casing 102 fluid tight, and thereby to provide a tight cover for chamber 6.

The liquid delivered through valve 4 passes through chamber 6 and upwardly through both sections of chamber 6 into the casing. The chamber 7, as will hereinafter be described, is sealed off from the casing 102, except for provisions to pass the liquid through the metering elements.

The casing 102 is also shown as provided with a dome or bell 147 to accommodate certain parts of the apparatus which will hereinafter appear.

The metering of the liquid is accomplished by the aid of two or more metering cylinders such as 148 and 149 (Figs. 3 and 19). These cylinders are mounted for oscillation on an axis transverse to the cylinder axis, upon opposite sides of an intermediate hollow column 150. This hollow column is shown to best advantage in Figs. 3, 4, 6 and 19. The manner in which this hollow column supports the cylinders 148 and 149 will be detailed hereinafter.

The hollow column 150 is divided by a central wall 151 into two compartments 152 and 153. The compartment 153 is open at the bottom of the column 150, which in turn is in communication with the chamber 7 in base 1 and thus with the outlet conduit 12. For this purpose the hollow column 150 is provided with the flange 154, appropriately fastened to the top of the base 1, to form a fluid tight connection with the inlet chamber 7, and as a cover therefor. Compartment 152 is in communication with the interior of the casing 102, as by the aid of an upstanding conduit 155 extending almost to the top of the bell 147. There is another restricted opening 156 near the bottom of the compartment 152 for the purpose of draining this compartment, but it is intended that substantially all of the liquid passing through the metering cylinders 148 and 149 be conducted from the top of the casing 102 downwardly through the conduit 155. In this way, even at low pressures, the tendency for air to accumulate in the top of the bell 147 is minimized by the washing effect of the liquid passing downwardly through the conduit 155.

It is also to be understood that the hollow column 150 prevents direct communication between the inlet chamber 6 and outlet chamber 7, whereby the communication from inlet to outlet must be by way of the metering cylinders 148 and 149.

Since both cylinders are substantially identical, a description of cylinder 149 is deemed sufficient. This cylinder is provided with a circular boss 157 journalled for oscillation in a recess in the left hand wall of the column 150. The upper head 158 of cylinder 149 is provided with a boss 159 serving as a guide for the piston stem 160. This piston stem passes completely through the piston 161 and is fastened thereto, as by the pin 162 (see cylinder 148). This pin passes through the central boss 163 of the piston.

The stem 160 is furthermore guided in the lower flanged head 164 of the cylinder 149, which has a reentrant tapered portion, the piston 161 telescoping over it in its innermost position, indicated by the right hand cylinder 148 and piston 161 (Fig. 3). Since the piston 161 is thus guided at opposite extremities of its stem 160, there is no tendency to cramp the piston in its cylinder, and the piston can be moved with a smooth sliding fit, without packing. This arrangement indeed serves to render the meter accurate even upon wide temperature variations of the liquid being measured, so as to deliver the same weight of liquid at all times.

The head 164 is made reentrant for the purpose of permitting the entry of the cranks 175 and 176 which drive the delivery shaft 173 by connection to the stems 160. The arrangement is such that liquid may pass from the compartment 152 into the upper and lower portions of the cylinders 148 and 149, but not necessarily in phase, whereby liquid pressure is exerted upon the pistons 151 in a direction to operate the cranks and thus to rotate the delivery shaft 173. The control of the passage of liquid from the intake compartment 152 to the two chambers in the interior of each of the cylinders 148 and 149 and then into the outlet compartment 153 may now be described.

Each of the cylinders 148 and 149 is provided with a wing-like port controlling flange 165 or 166. These flanges overlap the opposite sides of the hollow column 150, as shown most clearly in Fig. 19, and are maintained in fluid tight relationship with these walls by the pressure of the liquid exerted in casing 102 and surrounding the cylinders 148 and 149. Each of the cylinders 148 and 149 is provided with a pair of axially spaced apertures or ports 167 and 168 adjacent the column 150. These apertures, as shown most clearly in Fig. 4, are sector shaped, and their axis of symmetry is parallel to the axis of the corresponding cylinder. The upper ports 167 control ingress and egress of liquid to the cylinders above the pistons 161; and the lower ports 168 control the ingress and egress of liquid to the cylinders below the pistons 161.

During the oscillation of the cylinders, ports 167 are intended to be placed in alignment alternately with correspondingly shaped apertures or ports 169, 170; and ports 168 are intended to be placed in alignment alternately with corresponding shaped ports 171 and 172. The ports 169, 170, 171 and 172 are located in the contiguous walls of the hollow column 150. Of these apertures, the apertures 170 and 172 are in communication with the intake compartment 152; and apertures 169 and 171 are in communication with the outlet compartment 153.

When the axis of either cylinder 148 and 149 is parallel with the axis of the hollow column 150, the ports 167 and 168 are disposed respectively between apertures 169 and 170, and between apertures 171 and 172. Furthermore, ports 167 and 168 have an angular extent insufficient to bridge these apertures when they are in this central portion (Fig. 4).

Now let it be assumed that a cylinder, such as 149, is displaced from this parallel position so as to place port 167 in communication with aperture 170, and port 168 in communication with aperture 171. In this position the upper chamber of cylinder 149 is in communication with the intake compartment 152 and this part of cylinder 149 is filled from this intake compartment. On the other hand the lower part of the cylinder 149 defined by the lower surface of piston 161 is in communication with the outlet compartment 153. The pressure of the liquid in the upper part of the cylinder 149 urges the piston 161 downward to pass the liquid from the lower half of the cylinder 149 into the compartment 153 through the ports 168 and 171, and thence to outlet chamber 7 of base 1. The downward force exerted on piston 161 by the pressure of the liquid is utilized to rotate the crank shaft 173 which is journalled in the boss 174 extending between the walls of column 150. This crank shaft 173 carries cranks 175 and 176 at its opposite ends. Crank 175 is displaced 90° from crank 176 so that there is never a simultaneous dead center position of both cylinders 148 and 149. The crank 175 for cylinder 148 is connected to the stem 160 by the aid of the clevis 177.

The stem 160 for cylinder 149 is connected to its crank 176 in a manner shown most clearly in Fig. 5. This connection includes a clevis 178 joined to the end of the stem 160. The crank pin 179 carried by the crank 176, however, is located in an eccentric 180, intermediate the clevis 178 and pin 179. It is apparent that by adjusting the relative angular position of eccentric 180, the length of the crank stroke can be varied. This is provided for in order to make it possible to calibrate the liquid flow meter 2. In the design shown, each of the cylinders 148 and 149 is intended to deliver say a pint of liquid for one complete stroke. By the aid of the adjustable eccentric 180, the desired amount of delivery by the operation of the two cylinders 148 and 149 can be very accurately adjusted.

In order to make it possible to gain access to the eccentric 180, the left hand wall of casing 102 (Figs. 2 and 3) can be provided with a removable cover 181 opposite the place where the eccentric passes in the operation of the mechanism. The eccentric 180 may be held in adjusted position by the aid of a clamp nut 182 threaded on the threaded end of the pin 179, and clamping the eccentric 180 between the nut 182 and the contiguous face of the crank 176.

The cylinders 148 and 149 being free to oscillate about a transverse axis makes it unnecessary to provide a connecting rod between the piston stems 160 and the cranks 178 and 176.

It is obvious that when crank 176 associated with cylinder 149 makes a complete revolution, it causes a complete oscillation of the cylinder 149 about its transverse axis. In the position shown in Fig. 6, the extreme position in the clockwise direction is indicated. As crank 176 is urged downwardly by the liquid pressure in the upper part of the cylinder 149, as heretofore mentioned, the cylinder 149 begins its counterclockwise oscillation. When the crank 176 has reached its lowermost position, the communication between all of the ports associated with cylinder 149 is ended. This corresponds to a position where substantially all of the liquid in the lower part of the cylinder 149 has been passed to the outlet compartment 153, and where the upper portion of the cylinder 149 attains its maximum volume. The crank shaft 173, however, continues its rotation in a counterclockwise direction as viewed in Fig. 4, because in this position, the crank 175 is now intermediate between its lowest and highest position, and cylinder 148 has been oscillated to a position where its lower port 168 is in communication with the intake port 172. The upper port 167 of cylinder 148 is in communication with the outlet port 168, and liquid is delivered from the upper end of cylinder 148 to the outlet compartment 153. The crank 175 is thus moved upwardly by piston 161 in cylinder 148, to continue the counterclockwise rotation of shaft 173, as viewed in Fig. 4. Upon continued operation, the piston 161 in cylinder 148 reaches the end of its upward travel. The crank 176 in association with cylinder 149 being 90° behind crank 175, the cylinder 149 has now reached its extreme point in its oscillation in a counterclockwise direction as viewed in Fig. 6. In that position, port 167 is in communication with port 169, and liquid is delivered from the top of cylinder 149 through these ports to the outlet compartment 153. At the same time, port 168 of cylinder 149 is in communication with port 172, so that liquid enters from the intake compartment 152 into the lower portion of cylinder 149 below the piston 161 and urges the piston 161 upwardly. This continues until crank 176 reaches its uppermost position, when again the cylinder 149 reaches its intermediate position between its extreme limits of oscillation. The piston 161 of cylinder 148 however, has been urged downwardly to oscillate the cylinder 148 in the contrary direction. At this phase of the cycle, the ports 167 and 170 of cylinder 148 are in communication so that intake pressure is effective on the top of piston 161 in cylinder 148; and this continues until the lowermost position of crank 175 is reached as illustrated in Fig. 3.

Continued operation, as is apparent, will repeat the cycle as just described. For each position of the cylinder 148 and 149 there is a liquid pressure effected on one or the other side of one or both pistons 161 to continue the rotation in the counterclockwise direction as viewed in Fig. 4.

It is also apparent that the liquid flowing from the intake compartment 152 is later passed, by the pistons 161, into the outlet compartment 153, the amount delivered at each stroke being determined by the volume of the piston displacement.

The crank shaft 173 is coupled to the delivery shaft 101 as by the aid of a forked arm 183 (Figs. 3 and 4) which is engaged by an extension 184 of the crank pin 185.

It is apparent that the pressure of the liquid on the external surfaces of cylinders 148 and 149 would cause excessive friction between the flanges 165, 166 and the walls of the hollow column 150. In order to relieve this pressure, each of the hollow bosses 157 formed on the cylinders 148 and 149 is threaded for the accommodation of the threaded posts 186 and 187 extending inwardly toward each other. These threaded posts are held in adjusted position in the bosses 157 by the aid of the lock nuts 188 and 189. The inner ends of these threaded bosses carry the heads 190 made of hard wearing material, such as case hardened steel or the like, and are adapted to be in frictional contact. By appropriate adjustment of the posts 186 and 187, all of the frictional force may be concentrated on the hardened contacting surfaces of the heads 190. These surfaces wear at a much slower rate than the contacting surface of flanges 165 and 166. Accordingly the force exerted by the liquid pressure in the casing 102 is taken up by the hardened surfaces, and the flanges 165 and 166 are merely in fluid tight contact with the walls of the hollow column 150.

It is apparent that the liquid pressure in casing 102 serves to hold the cylinders 148 and 149 against the hollow column 150. However, in order to maintain these cylinders in place even for very low pressure operation, tension springs 191 (Fig. 4) may be provided between the ears 192 formed on the cylinders to urge the two cylinders toward each other.

Provisions are made for withdrawing all of the liquid from the casing 102 and from the associated chambers 6 and 7 should it be desired to remove casing 102 or valve 4, or to inspect the interior of these devices. For this purpose, small pet cocks, such as 193, can be provided in the base 1 communicating respectively with chambers 6 and 7. Furthermore, a similar pet cock 194 (Figs. 1 and 2) may be provided in the top of the bell 147 to permit the escape of any accumulated air when the apparatus is installed.

In order to relieve casing 102 from excessive liquid pressures, a spring pressed safety valve may also be provided in the bell 147. This is shown most clearly in Figs. 2 and 6. The safety valve is formed by an annular seat 195 supported by a spider 196. This seat 195 is held to the exterior wall of bell 147 as by bolts 197. Appropriate gaskets may be used between the seat 195 and the corresponding flange formed in the bell 147.

The closure 198 for the safety valve is carried by a central stem 199 guided in the boss 200 formed integral with spider 196. A compression spring 201 surrounds the boss 200 and engages a collar 202 carried by the stem 199. The left hand end of spring 201 is in contact with the spider 196. By appropriate choice of spring 201, it is apparent that the maximum pressure attainable in casing 102 before this spring can be compressed to urge closure 198 to open position may be predetermined.

The mode of operation of the liquid flow meter is apparent from the foregoing. The pressure of the liquid being metered is utilized to operate the pistons 161 in the oscillating cylinders 148 and 149; and the oscillations of these cylinders are utilized to close and open the ports in communication with the intake compartment 152 and the outlet compartment 153. In this way reciprocations of the pistons 161 are obtained. These reciprocations in turn are transformed into a rotary motion of crank shaft 173 and a corresponding rotary motion of the liquid flow meter delivery shaft 101.

Due to the reentrant form of the heads 164, the mechanism may be arranged in a compact manner in the casing 102.

As hereinbefore described, the counterclockwise rotation of shaft 173 as viewed in Fig. 4 imparts a counterclockwise rotation to gear 105, and gear 107 is given a clockwise rotation, as viewed in Figs. 8, 15 and 17. This is the correct direction of rotation to impart a counterclockwise motion of the operating member 96, for determining the end of the delivery cycle.

What is claimed is:

1. In a liquid measuring device, a liquid flow meter, a valve for the liquid, and a control mechanism for causing the valve to close upon passage of a predetermined volume of liquid, including a member movable to a valve controlling position, and a motion transmission mechanism between said member and the meter, said motion transmission mechanism including a rotatable wheel, means constantly urging the wheel in one direction, a restraint for holding the wheel against motion during the delivery cycle, and means for releasing said wheel at the end of cycle, to return said member to a definite initial position without affecting the meter.

2. In a device of the character described, a valve controlling flow of a liquid, a movable member for controlling the valve after a quantity of liquid is delivered, said member being returnable to an initial position at the completion of the delivery cycle, and means whereby the member is moved in one direction toward its controlling position and then returned to the initial position, comprising a planetary gear revolved about an axis in accordance with the liquid delivered, a pair of gears in mesh with the planetary gear, means urging one of said gears in one direction, means for restraining said one of said gears, whereby rotation is imparted to the other of said gears by the planetary gear, and means responsive to the arrival of the member to cycle completion position for releasing the restrained gear for returning the member to initial starting position.

3. In a device of the character described, a valve controlling flow of a liquid, a movable member for controlling the valve after a quantity of liquid is delivered, said member being returnable to an initial position at the completion of the delivery cycle, and means whereby the member is moved in one direction toward its controlling position and then returned to the initial position, comprising a planetary gear mechanism having a planetary gear and two coaxial gears rotatable about the axis of revolution of the planetary gear and in mesh therewith, means constantly urging one of said gears in one direction, a connection between one of the other gears and the member, means for actuating the third one of the gears in accordance with the amount of liquid delivered, means for restraining the constantly urged gear, and means for removing the restraint when the member reaches the end of the delivery cycle.

4. In combination, a valve having a piston closure member as well as an auxiliary closure member cooperating with a port in the piston closure member, and also a cylinder for the piston closure and in constant communication with a source of liquid through a restricted opening, smaller than the port in the piston closure member, whereby upon opening of the said port, the liquid pressure upon the discharge side of the piston closure urges the piston closure toward the auxiliary closure, and means to cause the auxiliary closure first to move the piston closure member to a dribble position with respect to its seat, and then later to complete the closing movement of the piston closure.

5. In combination, a valve having a piston closure member as well as an auxiliary closure member cooperating with a port in the piston closure member, and also a cylinder for the piston closure and in constant communication with the source of liquid through a retricted opening, smaller than the port in the piston closure member, whereby upon opening of the said port, the liquid pressure upon the discharge side of the piston closure urges the piston closure toward the auxiliary closure, and means to cause the auxiliary closure first to move the piston closure member to a dribble position with respect to its seat, and then later to complete the closing movement of the piston closure, said piston closure member having a series of notches for defining the dribble opening when the piston closure approaches closing position.

6. In a liquid metering device, a control valve, a liquid flow meter, a control mechanism between the flow meter and the valve, adapted to cause the valve to close at the end of a delivery cycle, and means for opening the valve to start the cycle, comprising a rotatable member, a spring connected to the member at a distance from the axis of rotation, whereby upon movement of the member to a definite position, the energy stored in the spring by the motion of the member will complete the movement thereof, an actuator for the valve moved by said member when the member is under the influence of the spring, to open the valve, latching means for holding said actuator in open position and out of the path of the member, and means for rotating said member toward open position, said means being so arranged that the movement of the member under the influence of the spring is unimpeded by the means for rotating it.

7. In a liquid measuring system, a valve having a closure member and a seat therefor, means for opening the valve, and means for closing the valve in at least two steps, comprising means operating first in response to the delivery of an amount of liquid less than the predetermined measured quantity to cause the pressure of the liquid directly to move the closure partly to its seat, and then in response to the delivery of the predetermined measured quantity, to cause the pressure of the liquid directly to close the valve completely.

8. In a liquid measuring system, a valve having a closure member and a seat therefor, means for opening the valve, and means to cause the pressure of the liquid to close the valve in at least two steps, comprising a latch operating to cause the pressure of the liquid to hold the closure in either of two positions, a member movable in accordance with the quantity of liquid delivered, and an operating arm connected to the latch in the path of said member and arranged to be moved by the member in succession for operating the latch in succession to permit the valve to be moved in steps to closed position by the pressure of the liquid.

9. In a control mechanism for automatically determining measurable quantities in successive measured pre-adjusted amounts, a member movable from an initial position to a position corresponding to the termination of the measuring function, means whereby said initial position may be adjusted to adjust the quantity to be measured, said termination position being fixed, and a drive mechanism for advancing the member to the termination position as well as thereafter to return said member to the adjusted initial position, comprising a pair of gears, one for advancing said member, a force exerting means urging the member toward its initial position, and a releasable restraint for said other gear and arranged to be released in response to the arrival of the member to its termination position, for permitting said member to move to its initial position.

10. In a control mechanism for automatically determining measurable quantities in successive measured pre-adjusted amounts, a member movable from an initial position to a position corresponding to the termination of the measuring function, an indicating mechanism operatively joined to the member for indicating its position, means whereby said initial position may be adjusted to adjust the quantity to be measured, said termination position being fixed, and a drive mechanism for advancing the member to the termination position as well as thereafter to return said member to the adjusted initial position, comprising a pair of gears, one for advancing said member, a force exerting means urging the member toward its initial position, and a releasable restraint for said other gear and arranged to be released in response to the arrival of the member to its termination position, for permitting said member to move to its initial position.

11. In a control mechanism for automatically determining measurable quantities in successive measured pre-adjusted amounts, a member movable from an initial position to a position corresponding to the termination of the measuring functions, an indicating mechanism operatively joined to the member for indicating its position, means whereby said initial position may be adjusted to adjust the quantity to be measured, said termination position being fixed, and a drive mechanism for advancing the member to the termination position as well as thereafter to return said member to the adjusted initial position, comprising a pair of coaxial gears, one of them joined to the member, the other having freedom of motion about its axis, a releasable restraint for the other gear, and arranged to be released in response to the arrival of the member to its termination position, planetary gearing engaging said gears and having an axis adapted to be revolved about the axis of the gears for rotating said one gear to advance said member, and means urging the said one gear in a direction to rotate the planetary gearing to operate the said one gear for returning said member to its initial position when the restraint imposed upon the rotation of the planetary gearing about its own axis is removed by removal of the restraint upon the other of said gears.

FRANCIS WALTER GUIBERT.
FREDERIC B. FULLER.